(12) United States Patent
Awwiller

(10) Patent No.: US 7,933,757 B2
(45) Date of Patent: Apr. 26, 2011

(54) METHOD FOR SIMULATING AND ESTIMATING SANDSTONE PROPERTIES

(75) Inventor: David N. Awwiller, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 1241 days.

(21) Appl. No.: 10/592,305

(22) PCT Filed: Jan. 26, 2005

(86) PCT No.: PCT/US2005/002378
§ 371 (c)(1),
(2), (4) Date: Sep. 11, 2006

(87) PCT Pub. No.: WO2005/104002
PCT Pub. Date: Nov. 3, 2005

(65) Prior Publication Data
US 2007/0203677 A1  Aug. 30, 2007

Related U.S. Application Data

(60) Provisional application No. 60/558,284, filed on Mar. 31, 2004.

(51) Int. Cl.
*G06G 7/50* (2006.01)
(52) U.S. Cl. .................................. 703/9; 703/2
(58) Field of Classification Search ............ 703/10, 703/6, 9, 2
See application file for complete search history.

(56) References Cited

U.S. PATENT DOCUMENTS

| | | |
|---|---|---|
| 4,366,073 A | 12/1982 | McLaughlin et al. ....... 252/8.55 |
| 4,679,174 A | 7/1987 | Gelfand |
| 4,991,095 A | 2/1991 | Swanson |
| 5,282,384 A | 2/1994 | Holbrook ..................... 73/152 |
| 5,844,799 A | 12/1998 | Joseph et al. .................... 702/2 |
| 5,995,906 A | 11/1999 | Doyen et al. |
| 6,070,125 A | 5/2000 | Murphy et al. |
| 6,246,963 B1 | 6/2001 | Cross et al. |
| 6,516,080 B1 | 2/2003 | Nur ............................ 382/109 |
| 6,674,432 B2 | 1/2004 | Kennon et al. |
| 6,754,588 B2 | 6/2004 | Cross et al. |
| 6,754,788 B2 | 6/2004 | Mathews et al. |
| 6,885,941 B2 | 4/2005 | Deffenbaugh et al. |
| 6,941,255 B2 | 9/2005 | Kennon et al. |
| 7,006,951 B2 | 2/2006 | Pond, Jr. et al. |

(Continued)

FOREIGN PATENT DOCUMENTS
WO   WO2006/031383   3/2006

(Continued)

OTHER PUBLICATIONS

Bonnell, L.M., Lander, R.H., Matthews, J.C., and Lowrey, C.J. (1999) "Probabilistic prediction of reservoir quality in deep water prospects using an empirically calibrated process model", (abs.). *AAPG Bull.*, v. 83, p. 1301.

(Continued)

*Primary Examiner* — Jason Proctor
*Assistant Examiner* — Luke Osborne

(57) ABSTRACT

The invention is a method for simulating sandstone deposition. The sandstone is simulated by estimating the grain size distribution and mineral composition of grains in the sandstone, simulating sedimentation of grains from the grain size distribution and mineral composition of the grains, simulating compaction of the grains, and simulating cementation of the grains. Properties of the sandstone such as porosity and permeability may be estimated from the simulated sandstone. The method permits multiple mineralogies to be simulated during the burial history of sedimentation, compaction and cementation.

18 Claims, 9 Drawing Sheets

U.S. PATENT DOCUMENTS

| | | | |
|---|---|---|---|
| 7,027,964 | B2 | 4/2006 | Kennon |
| 7,043,367 | B2 | 5/2006 | Granjeon |
| 7,043,413 | B2 | 5/2006 | Ward et al. |
| 7,062,383 | B2 | 6/2006 | Deffenbaugh et al. |
| 7,079,953 | B2 | 7/2006 | Thorne |
| 7,117,091 | B2 | 10/2006 | Masson et al. |
| 7,123,258 | B2 | 10/2006 | Deny et al. |
| 7,149,671 | B2 | 12/2006 | Lim et al. |
| 7,260,508 | B2 | 8/2007 | Lim et al. |
| 7,292,241 | B2 | 11/2007 | Thore et al. |
| 7,337,069 | B2 | 2/2008 | Masson et al. |
| 7,340,385 | B2 | 3/2008 | James |
| 7,363,158 | B2 | 4/2008 | Stelting et al. |
| 7,369,973 | B2 | 5/2008 | Kennon et al. |
| 7,369,980 | B2 | 5/2008 | Deffenbaugh et al. |
| 7,392,136 | B2 | 6/2008 | Salles et al. |
| 7,516,055 | B2 | 4/2009 | Strebelle |
| 2002/0120429 | A1 | 8/2002 | Ortoleva .......................... 703/2 |
| 2006/0041409 | A1 | 2/2006 | Strebelle et al. |
| 2007/0219724 | A1 | 9/2007 | Li et al. |
| 2007/0276604 | A1 | 11/2007 | Williams et al. |
| 2008/0015784 | A1 | 1/2008 | Dorn et al. |

FOREIGN PATENT DOCUMENTS

| | | |
|---|---|---|
| WO | WO2006/036389 | 4/2006 |
| WO | WO2008/005690 | 10/2008 |

OTHER PUBLICATIONS

Chen, S., and Doolen, G.D. (1998) "Lattice Boltzmann method for fluid flows", *Annual Rev. Fluid Mech.*, v. 30, pp. 329-364.

Dillon, C. G. et al (2004) "Simulations of the Effects of Diagenesis on the Evolution of Sandstone Porosity", *Journal of Sedimentary Research*, v. 74, No. 6, Nov. 2004, pp. 877-888.

Davies, J. et al (1999) "Stress-Dependent Permeability: Characterization and Modeling", *SPE 56813*, Houston, Texas, Oct. 3-6, 1999, 9 pgs. + 20 Figs.

Gunstensen, A.K., and Rothman, D.H. (1993) "Lattice-Boltzmann studies of immiscible two-phase flow through porous media", *Journal of Geophysical Research, B, Solid Earth and Planets*, v. 98, pp. 6431-6441.

Jin, G. et al. (2003) "Physics-Based Reconstruction of Sedimentary Rocks" *SPE 83587*, May 19-24, 2003, 14 pgs.

Krumbein, W.C. (1934) "Size frequency distributions of sediments", *Jour. Sed. Petrology*, v. 4, pp. 65-77.

Lander, R.H., and Walderhaug, O. (1999) "Porosity prediction through simulation of sandstone compaction and quartz cementation", *AAPG Bulletin*, v. 83, pp. 433-449.

Lander, R.H., Gale, J.F.W., Laubauch, S.E., and Bonnell, L. M. (2002) "Interaction between quartz cementation and fracturing in sandstone", *AAPG Annual Convention Program*, v. 11, p9. A98-A99.

Øren, P.-E. and S. Bakke (2002) "Process Based Reconstruction of Sandstones and Prediction of Transport Properties", *Transport in Porous Media*, v. 46, pp. 311-343.

Panda, M. N., and L. W. Lake (1994) "Estimation of single-phase permeability from parameters of particle-size distribution", *AAPG Bulletin*, v. 78, pp. 1028-1039.

Panda, M. N., and L. W. Lake (1995) "A physical model of cementation and its effects on single-phase permeability", *AAPG Bulletin*, v. 79, pp. 431-443.

Verberg, R., and Ladd, A.J.C. (1999) "Simulation of low-Ryenolds-number flow via a time-independent lattice-Boltzmann method", *Physical Review E.*, v. 60, pp. 3366-3373.

Walderhaug, O. (1994) "Precipitation rates for quartz cement in sandstones determined by fluid-inclusion microthermometry and temperature-history modeling", *Jour. Sed. Research*, Section A, v. 64, p. 324-333.

Wangen, M. (1997) "Modeling Porosity Evolution and Cementation of Sandstones", *Marine and Petroleum Geology*, v. 15, p. 453-465, XP002296508.

EP Standard Search Report No. 111304US (2004).

PCT International Search Report (2005).

METHOD FOR SIMULATING AND ESTIMATING SANDSTONE PROPERTIES

This application is the National Stage of International Application No. PCT/US2005/02378, filed Jan. 26, 2005, which claims the benefit of U.S. Provisional Patent Application No. 60/558,284, filed Mar. 31, 2004.

FIELD OF THE INVENTION

This invention generally relates to the field of geological modeling. More particularly, this invention provides the ability to determine the properties of sandstones from a thin section sample of the sandstone.

BACKGROUND OF THE INVENTION

Characteristics of sandstone reservoirs including porosity and permeability are of great importance to the petroleum industry. The prediction of these characteristics in the absence of measured (or hard) data is of great economic value because these data are used to evaluate the economic viability of hydrocarbon production facilities. Process-based approaches for simulating porosity and permeability are designed to predict pore-structure evolution as a result of the physical characteristics (such as grain size and grain composition) of the original sediment and the environmental conditions that the sediment is subjected to after deposition.

A number of workers (such as, Lander and Walderhaug, 1999; Bonnell et al., 1999) have presented zero-dimensional process-based models for predicting reservoir quality characteristics of sandstones. These models are very powerful and have been used to accurately predict static bulk properties such as cement abundance, average compaction, and porosity. Unfortunately, these models are of limited use for predicting permeability, since the flow characteristics of a porous medium are related not only to the porosity, but the three-dimensional relations (connectivity) between pores and the roughness and individual shape of pores.

Øren and Bakke (2002) published a study in which they outline a process for reconstruction of the sandstones and prediction of the transport properties of the sandstones. However, the authors admit, "It is unclear how accurately it can reproduce more heterogeneous and diagentically complex sandstones such as those often encountered in the oil industry." Accordingly there is a need for a more accurate process using more sophisticated algorithms for predicting compaction, cementation, and permeability. This invention satisfies that need.

Recently, Dillon et al. (2004) published a study in which they simulate porosity and permeability evolution via manipulation of sandstone images. The authors are able to more realistically model diagenetic evolution than Oren and Bakke (2002). Their methodology relies heavily on sandstone thin-section image processing; as such, they (a) require rock samples in order to begin their analysis, and (b) are limited to two-dimensional space, whereas true sandstone pore networks are three-dimensional.

SUMMARY OF THE INVENTION

In one embodiment, the present invention is a method for simulating sandstone deposition. The method comprises estimating the grain size distribution and mineral composition distribution of grains in the sandstone; simulating of sedimentation of grains using the grain size distribution and mineral composition distribution of the grains; simulating compaction of the grains; and simulating cementation of the grains. The burial history may be incorporated into this method through the use of burial history modeling.

In a second embodiment, the invention comprises a method for estimating properties of the sandstone such as porosity and permeability from the simulated sandstone. Properties of the sandstone such as porosity and permeability may be estimated from the simulated sandstone.

DETAILED DESCRIPTION

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents that are included within the spirit and scope of the invention, as defined by the appended claims.

The methods presented below are designed to predict the rock properties including but not limited to porosity and permeability properties of hydrocarbon-reservoir sandstones. This method combines a series of process-based steps that are designed to simulate the sedimentation, compaction, and cementation of sandstones. Rock properties which are directly related to the product of these steps are then calculated.

This method provides the ability to simulate the processes that influence and modify sedimentary properties such as porosity and permeability, rather than the end-result of those processes (for example, a pore network). In one embodiment, the algorithms explicitly incorporate and simulate the effect burial and thermal history, and the effects of burial and temperature are explicitly incorporated in our compaction and cementation algorithms.

Sandstone is defined here as a collection of silicate grains that have been deposited by the action of wind or water at the sediment-air or sediment-water interface. The collection of grains is relatively homogeneous, and occupies a volume of a few cubic millimeters to a few cubic centimeters. Subsequent to deposition the collection of grains is typically subjected to burial and heating. These processes cause grain rearrangement and cementation, both of which influence rock properties such as porosity and permeability.

Figure 1:
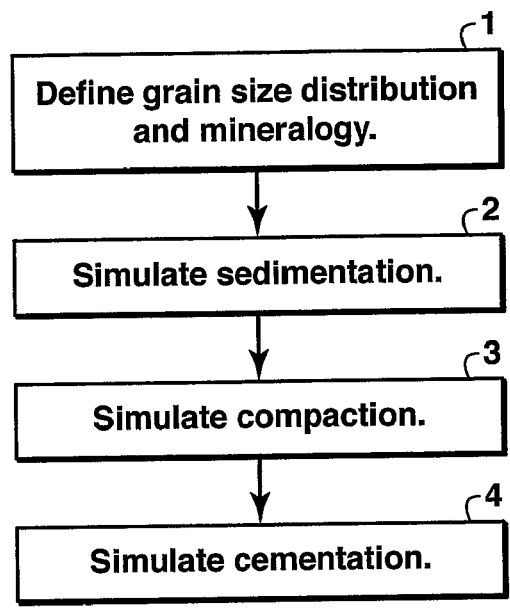
FIG. 1 is a flow chart showing the primary steps of one embodiment of the invention.

In one embodiment, the process for simulating sandstone deposition, compaction, and cementation comprises four steps. As shown in FIG. 1, step 1, the grain size distribution and mineral components distribution of the sandstone is defined. In step 2, grain sedimentation is simulated. Step 3, simulates compaction by grain rearrangement and deformation. Step 4 simulates cementation by using clustering algorithms and kinetic expressions to grow cement. Rock properties including permeability of the pore network that result from processes described above may then be estimated.

Define Grain Size Distribution and Mineral Components of the Sandstone:

Step 1 of FIG. 1 involves defining or estimating grain size distribution and mineral components of the sandstone. Each sand grain that exists in a simulated sandstone has two properties: mineralogy and radius. These properties are fundamental, and influence how the collection of grains is affected by subsequent processing steps.

The mineralogy of a grain includes the composition, shape, ductility, and microporosity of that grain. Most sandstone grains are comprised of the minerals quartz, potassium feldspar, plagioclase feldspar, plus lesser amounts of rock fragments, glauconite, mica, and other minerals. The relative abundance of these minerals in the grain collection is provided by the operator. The abundance of these materials may be determined from measured or modeled mineral distributions. Each mineral type has associated microporosity and ductility terms. Microporosity is defined as the fraction of the mineral volume that is not solid, but instead is voids. These voids are typically isolated from one another and from void space that exists between each grain. Ductility is defined as the extent to which a mineral will deform if stress is applied to that mineral. Values may be any fractional value between 0 (completely rigid) and 1 (completely ductile).

Preferably, all grains are modeled as spheres. However, the algorithms disclosed below are capable of modeling multiple mineralogies and do not assume all detrial sand grains are quartz grains. The collection of grains that comprise a sandstone typically has a range, or distribution, of grain radii which may be very narrow (a few micrometers) or very broad (several millimeters). The operator provides the distribution for a simulation. Two possible methods for determining this simulation are described below:

One grain size method assumes a gaussian (i.e., normal) mass distribution on the phi ('ϕ', or −log 2 (mm) scale; Krumbein, 1934). The mass distribution is converted to a number distribution assuming all grains are of equal density:

$$psd_n = \sum_{i=0}^{n} \left( \frac{m_i \sigma_i}{4/3\pi r_i^3} \right) \quad [1]$$

wherein:
$psd_n$=number particle size distribution
$m_i$=mass of the population of i-sized particles
$\sigma_i$=density of i-sized particles
$r_i$=the radius of i-sized particles A second grain size method provides the number distribution of all grains in the population by modeling, using an array of grain size inputs. An operator may take grain size input from multiple of sources. Examples of methods for obtaining grain size distributions include but are not limited to, core samples, rock samples, thin sections, numerical model results, and other methods known in the art.

Figure 2:
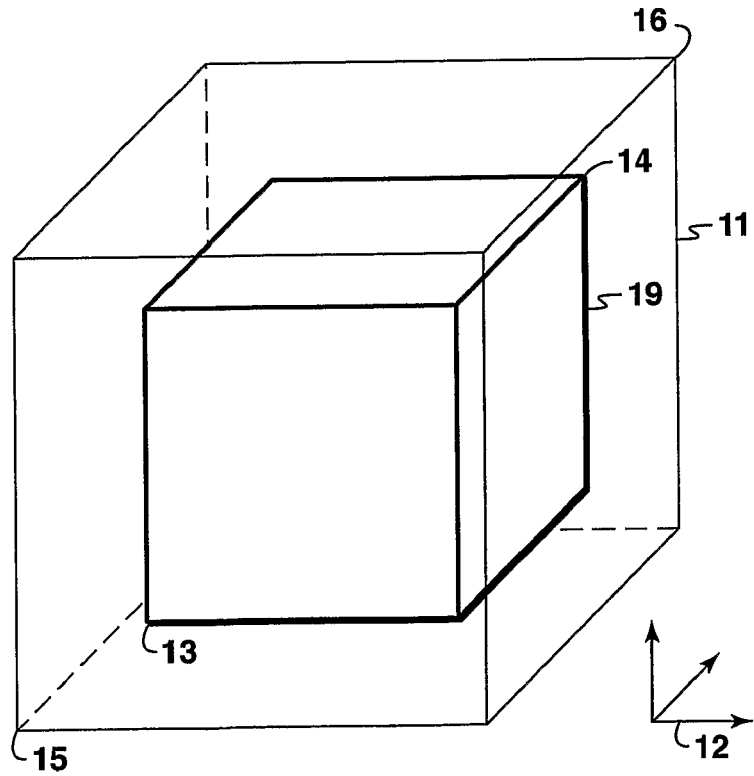
FIG. 2 is an illustration of a model volume for simulating sedimentation.

Simulate Sedimentation:

Now referring to step 2 of FIG. 1, sedimentation is simulated after the grain size distribution and mineral composition are determined. In one embodiment, as shown in FIG. 2, the operator first defines a model volume 11, within which a simulation will be conducted. The model volume 11 typically is a box between 5-100 mm³. The volume of interest 19 with x, y, z coordinates 12 has a minimum coordinate 13 of (0,0,0) and a maximum coordinate 14 of (xmax, ymax, zmax). The model volume coordinates 15, 16 are distanced from the volume of interest coordinates 13, 14 by a length equal to three grain radii of the largest grain in the input distribution. Preferably, the width, length, and height of the volume of interest should be at least 30 times the size of the average grain radius.

As shown in FIG. 2, a three-dimensional global model volume 11 encloses this user-defined volume of interest 19 defined by x, y, z directions 12. The global volume 11 is much larger than the volume of interest 19, in order to minimize packing dislocations associated with the edges of the model 'box'. This box allows grains to settle in three-dimensional space permitting more accurate simulating of grain sedimentation. The global model bounds are defined by:

$$Xg_{min}=Yg_{min}=Zg_{min}=-3r_{max} \quad (2a)$$

$$Xg_{max}=Xi_{max}+3r_{max} \quad (2b)$$

$$Yg_{max}=Yi_{max}+3r_{max} \quad (2c)$$

$$Zg_{max}=\infty \quad (2d)$$

wherein:
$Xg_{min}, Yg_{min}, Zg_{min}$=minimum x, y, and z coordinates in the global volume which is illustrated as element 15 in FIG. 2,
$Xg_{max}, Yg_{max}, Zg_{max}$=maximum x, y, and z coordinates in the global volume which is illustrated as element 16 in FIG. 2,
$Xi_{max}, Yi_{max}$=maximum x, y coordinates in the volume of interest which is illustrated as element 14 in FIG. 2,
$r_{max}$=radius of the largest grain in the defined grain size distribution, and
∞=infinity.

The input grain size distribution, mineral distribution and properties, and the model bounds form the basis for sedimentation modeling. Grains are picked randomly from the grain size distribution and assigned mineralogy randomly from the mineral distribution. The center point of each grain is then assigned a random initial (x, y, ∞) coordinate within the volume of interest, and allowed to fall towards the bottom of the global model box. This algorithm simulates sequential deposition of sand grains due to gravity.

Figure 3:
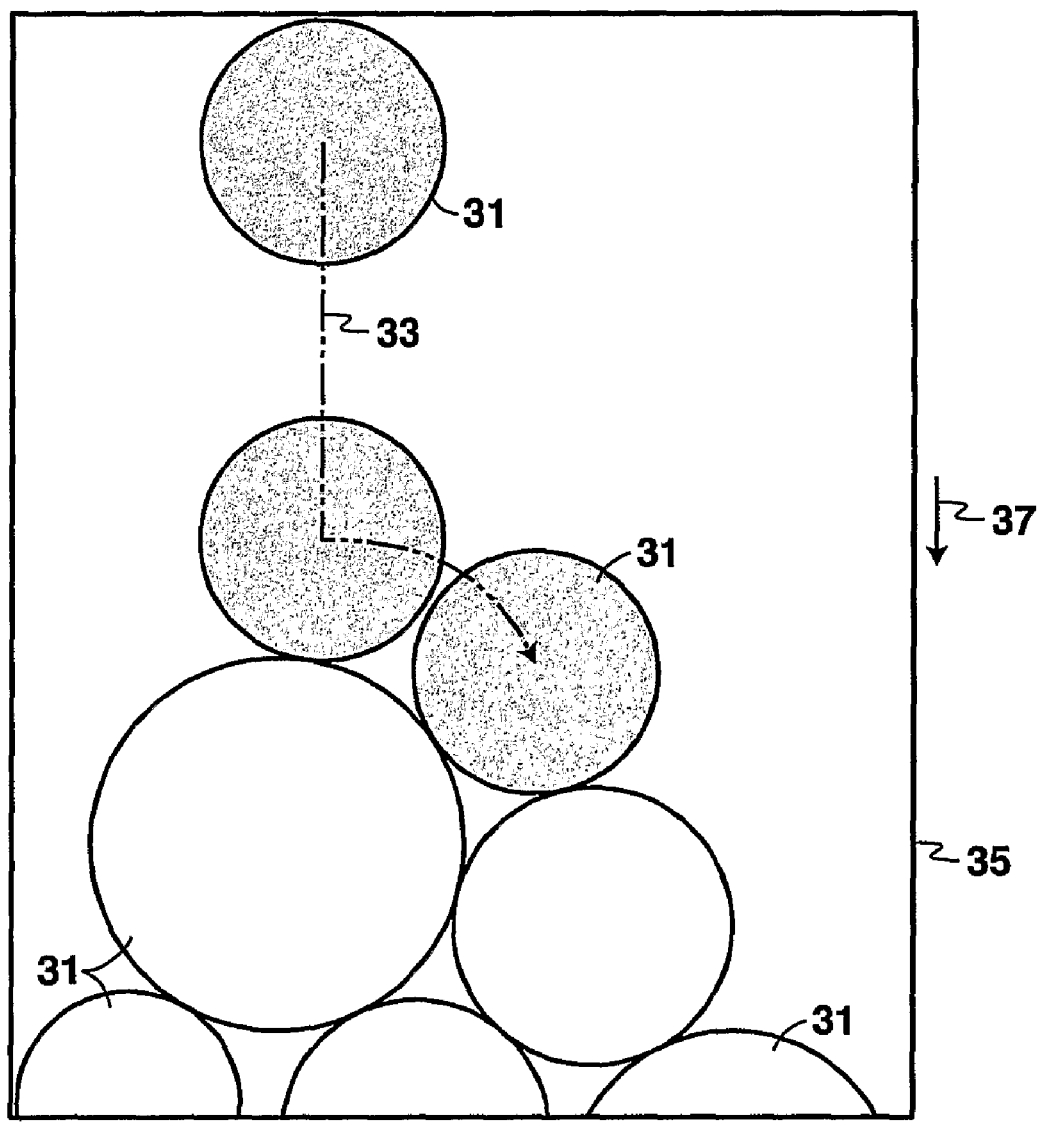
FIG. 3 is an illustration of sequential deposition of grains during sedimentation simulation.

As shown in FIG. 3 each grain 31 is allowed to drop in the −z direction 37 of FIG. 2 until it encounters an edge of the global model volume 35 or another grain 31. The path of a sample grain is shown as arrow 33. When the grain touches another grain it rolls down the maximum local gradient until it comes to rest at a position that is stable relative to the surrounding grains. Grains that contact the global volume bounds respond as if they have contacted another grain at that position. Falling grains do not dislodge previously deposited grains. The resultant pile of grains has many packing dislocations, and as a result relatively high intergranular volume, or void space.

In one embodiment various mineralogies of at least two mineralogies may be modeled by assigning each grain a specific weight that is not necessarily proportional to its diameter. This may allow the grains to settle in the volume or box in a more realistic pattern. The minealogy of each grain, and the overall distribution of the minerals, may be tracked throughout the model.

Simulate Compaction:

Now referring to step 3 of FIG. 1, grains are re-arranged and deformed as a result of increasing overburden stress. This process results in a tighter grain pack, with less porosity, than the original uncompacted grain pack. The compaction process often deforms ductile grains and fractures rigid grains, but results in very little loss of grain mass from the system. The extent to which grain compaction can proceed depends on the amount of overburden stress and the ductility, or plasticity, of the grains.

In one embodiment, the compaction process is simulated by using the above-described sedimentation algorithm, modified to allow for elastic and ductile grain deformation due to the overburden stress. Preferably, burial history models are used to estimate overburden stress. Standard industry practice is to use burial history models that calculate the time-temperature-pressure evolution of beds as they are buried in the subsurface. The pressures and temperatures that subsurface sediments experience through the burial process may be difficult to calculate and thus are a major source of uncertainty. Typically, broad ranges of pressures and temperature through time are assigned to the beds related to the estimated column of overlying rock, speed of burial, and surrounding rock properties as the bed is buried. The burial history of the sediments of interest is plotted on a pressure versus temperature diagram. These plots are typically made using basin modeling software. In this embodiment, the use of the burial history plots allows the simulation process to incorporate changing environmental conditions such as pressure and temperature throughout the burial history of the grains. The burial history information may be used to help simulate compaction and cementation of the grains.

Elastic Grain Deformation:

In order to simulate elastic deformation we allow the grains to temporarily shrink by an amount proportional to the overburden stress:

$$dV = \frac{Vr}{Vo} = \kappa\sigma \quad (3)$$

wherein:
Vr=volume of the grain in the presence of a uniform stress field,
Vo=volume of the grain in under atmospheric (no effective stress) conditions,
σ=effective stress (MPa),
κ=a compressibility constant (MPa$^{-1}$)

Figure 4:
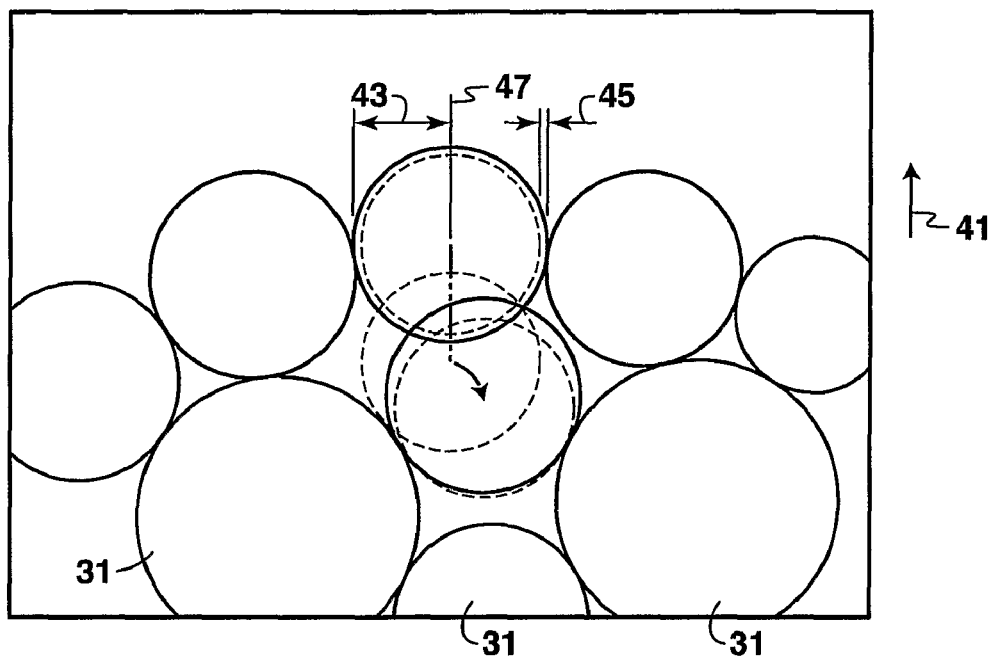
FIG. 4 is an illustration of elastic grain deformation and settling during compaction simulation.

As shown in FIG. 4, the grains 31 are sorted in order of increasing z coordinate 41. Then the radius 43 of each grain is sequentially reduced by the amount 45 that results in a change in volume dictated by equation (3). Each grain is dropped from it's (x, y, z) coordinate, and allowed to roll downwards according to the rules for sedimentation described above. A possible path of grain 31 is shown by arrow 47. After the grain comes to rest, it is allowed to expand, or 'relax,' back to it's true radius. If the space around the grain allows, its centerpoint is adjusted so that the edges of the grain do not overlap with the edges of any adjacent grain. If space around the resting point of the grain does not permit, it is moved back along its downward-movement path until a point is found with space adequate to permit placement of the grain.

Figure 5:
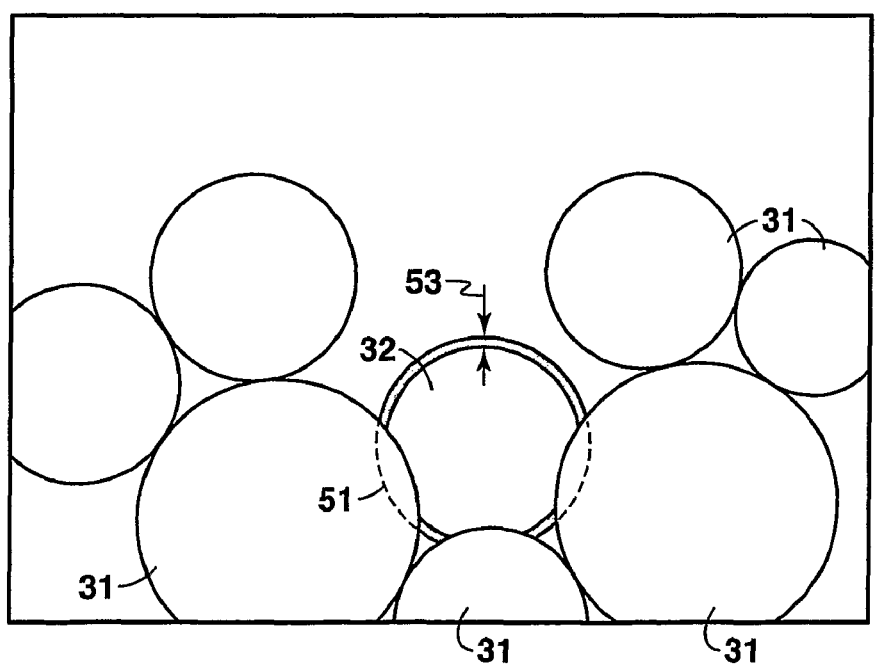
FIG. 5 is an illustration of ductile grain deformation during compaction simulation.

Plastic (Ductile) Grain Deformation:

Ductile grains are allowed to deform as overburden stress is applied. Deformation results in non-spherical grains with no change in volume:

$$V_{dg}=V_{ug}=4/3\pi r_{ug}^3 \quad (4)$$

wherein:
$V_{dg}$=volume of the grain after deformation
$V_{ug}$=volume of the grain before deformation (such as, at time of sedimentation)
$r_{ug}$ is the undeformed grain radius Ductile grain deformation is simulated using the algorithm described above for elastic grain deformation, with one possible modification. As shown in FIG. 5, when grain 32 comes to a rest and is allowed to 'relax' back to its true radius. This modification allows ductile grain 32 radii to overlap 51 with adjacent grains 31. The maximum permitted radius overlap is controlled by the ductility of any given grain. The volume defined by the overlap of radii is then recovered by allowing the ductile grain to expand 53 in a spherical manner into adjacent pore space. As a result, the volume of the deformed grain is identical to that of the grain before deformation.

The elastic (equation 3) and ductile grain deformation equations allow for both elastic and ductile grain deformation during compaction simulation. The ability to model both elastic and ductile deformation during compaction simulation provides increased accuracy in the simulation and more accurate prediction of the properties of the modeled sediments.

Figure 6:
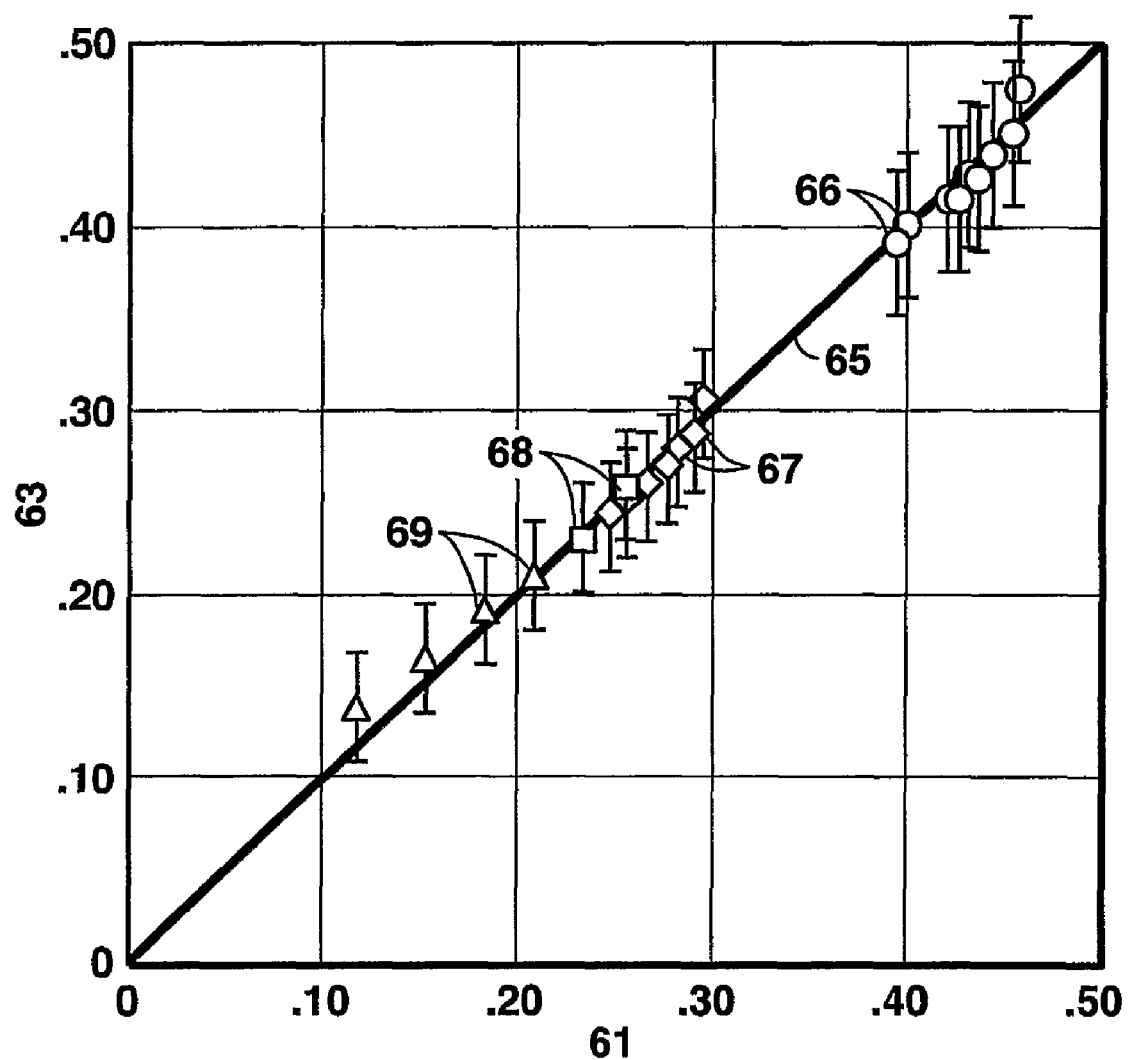
FIG. 6 is a graph of measured and modeled void space.

FIG. 6 is a graphic representation comparing measured 63 and simulated 61 (or modeled) packing from the sedimentation and compaction models presented above. The simulation results are plotted on the horizontal axis 61, and measured packing data (with uncertainty bars) are plotted on the vertical axis 63. A 1:1 line 65 is included in the plot, indicating close agreement between measured and simulated results. Results plotted include those for depositional packing 66, and fully compacted quartz arenites 67, sublitharenites 68, and litharenites 69.

Pore-Filling Clay:

Detrital clay (very fine-grained particles deposited with the sand grains) is common in hydrocarbon reservoirs. This clay often fills the pores between sand grains, reducing porosity and permeability of the sand. The clay may be concentrated in layers ('laminated clay'), or fairly evenly distributed through the sample ('dispersed clay').

Figure 7A:
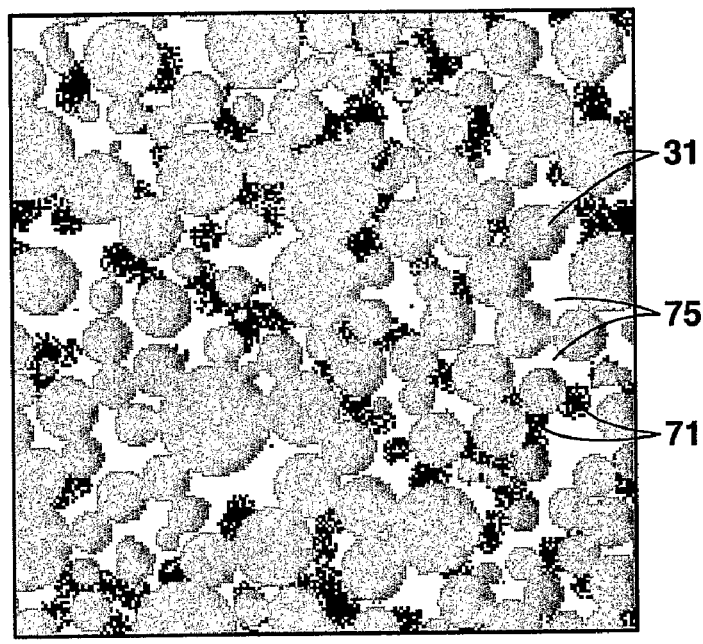
FIGS. 7(a) and 7(b) are illustrations of dispersed and laminated pore-filing clay respectively.
Figure 7B:
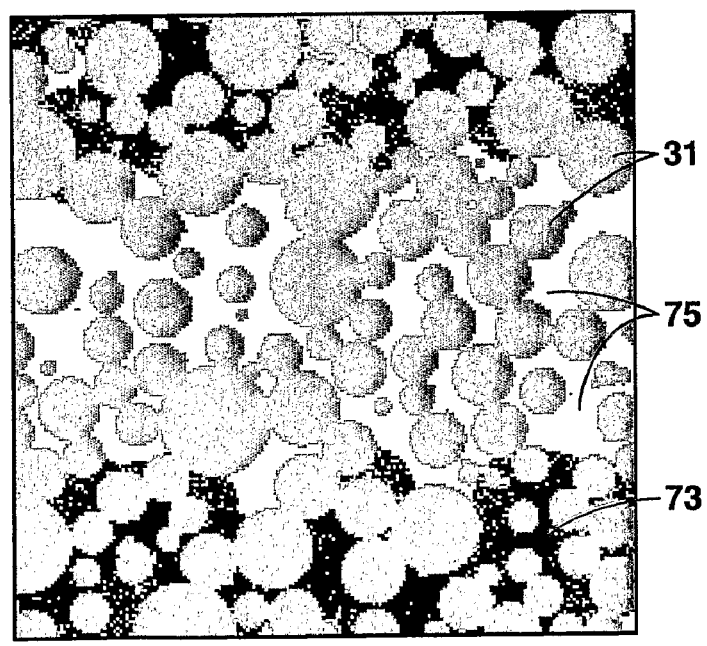

In one embodiment clustering algorithms are used to distribute clay in our simulated rock. The user defines the amount of clay to be inserted into the rock, size and density of the clay 'clusters', and the mode of distribution (laminated or dispersed). The clay distribution mode, abundance, and cluster density all affect the pore structure, and therefore the flow characteristics, of the sediment. FIGS. 7(*a*) and 7(*b*) illustrate respectively dispersed 71 and laminated 73 pore-filing clay.

Simulate Cementation:

Cement precipitates on the edges of sand grains and pore-filling clay as a result of temperature, time, and the abundance of dissolved ions in the pore fluid associated with a buried collection of sand grains. The cement binds sand grains together, converting relatively unconsolidated sand into rock.

The cement-growth process leads to a reduction in porosity. Preferably, quartz cement growth is explicitly modeled in this process.

Quartz cement is the most common cement in sandstone hydrocarbon reservoirs. It precipitates on quartz sand grains, which are typically the most common grain type in sandstone hydrocarbon reservoirs. Time, temperature, abundance of quartz grain surface area, cement crystal face type, and the crystallographic orientation of individual sand grains control the rate of quartz cement growth (e.g., Walderhaug, 1994; Lander et al, 2002).

Cement growth rate may be calculated using an expanded Arrhenius kinetic formulation:

$$\text{rate} = (A_{Can} f\!f_{Can} + A_{Ceu} f\!f_{Ceu} + A_{Aan} f\!f_{Aan} + A_{Aeu} f\!f_{Aeu}) e^{-Ea/RT} \quad (5)$$

wherein:
rate=instantaneous nucleation rate (mol s$^{-1}$),
Ceu=euhedrally terminated c-axis growth face,
Can=non-euhedral ('anhedral') c-axis growth face,
Aeu=euhedrally terminated a-axis growth face,
Aan=non-euhedral ('anhedral') a-axis growth face,
Ax=surface area corresponding to each of the above-defined growth faces (cm$^2$),
ffx=Arrhenius preexponential constant corresponding to each of the above-defined growth faces (mol·cm$^{-2}$·s$^{-1}$),
Ea=activation energy of the nucleation reaction (J·mol$^{-1}$),
R=Ideal gas constant (J·mol$^{-1}$·K$^{-1}$),
T=temperature (K).

Figure 8:
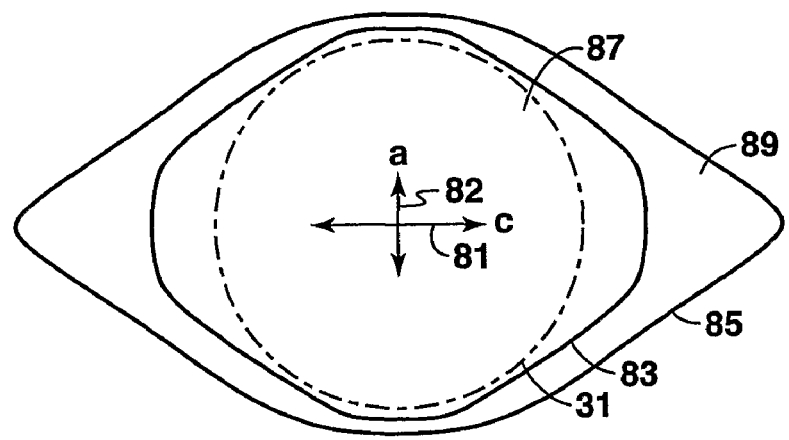
FIG. 8 is an illustration of a single grain growing quartz cement; evolving from a sphere to a hexagonal dipyramid.

The activation energy and preexponential constants are known from published studies (for example, Lander and Walderhaug, 1999; Lander et al, 2002). By integrating over the thermal history of the sample, the total volume and distribution of quartz cement may be calculated. As shown in FIG. 8, in the absence of any interference, a single grain 31 will grow cement proportionally as shown by directional arrows 81 and 82. The growth of the cement is in such a manner that grain-cement pairs 83 and 85 will cause the grain to evolve from a sphere 87 into a grain-cement pair shaped like a hexagonal dipyramid 89.

Figure 9:
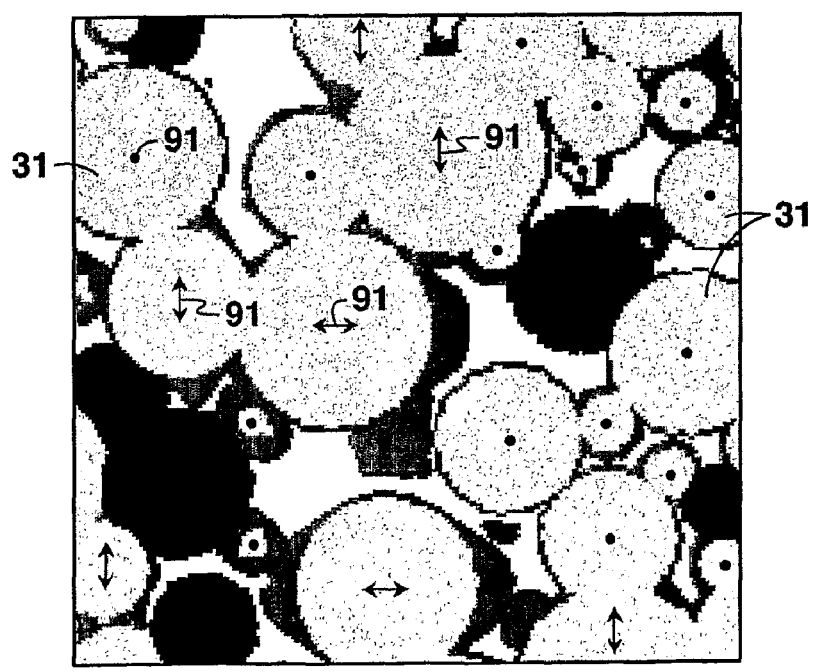
FIG. 9 is an illustration of cement growth simulation on a compacted volume of grains.

FIG. 9 is an illustrative example of a slice through a cemented grain 31 volume. As shown in FIG. 9, quartz cement growth simulation on a compacted sand volume is initiated by assigning a random c-axis orientation 91 to each quartz grain and determining the initial surface area available for each mode of cement growth. Quartz cement growth is then permitted to proceed through the pressure or thermal history of the rock (such as, the temperatures and pressures to which the rock has been exposed to, from it's deposition to the present day) using a finite difference method. As discussed above the pressure and thermal history of the rock can be obtained from burial history models or plots. Surface area (Ax from equation 5) for each crystal growth direction is updated after each step in cement growth. This technique allows simulating the cementing of multiple mineralogies over the burial history of the deposits. Dissolution of chemically unstable rock components such as feldspar and volcanic rock fragments may be modeled by selectively removing portions of these components from the modeled rock volume.

Estimating Properties of the Sediment:

Properties of the sediments such as porosity, pore connectivity and permeability are calculated for the rock volumes after sedimentation, compaction, and cementation have been simulated. Porosity is directly calculated from the volume after the sedimentation, compaction and cementation steps described above have been performed. More specifically, porosity is calculated as the difference between the total model volume, and the sum of the volumes of grains, cement, and clay matrix that occupy the model volume. Permeability of the pore network may be calculated by either of two methods: a bulk-volume method, or a Lattice-Bolzmann method.

In one embodiment a Bulk-volume modified Kozeny-Carman permeability method to calculate permeability. The permeability of a relatively homogeneous, uncemented porous media are calculated using a modified version of the method outlined by Panda and Lake (1994, 1995), in which permeability is related to effective or 'clean' porosity, pore connectivity, and the surface area of the pore network:

$$k = \frac{\phi^3}{2\tau(1-\phi)^2 a_v^2} \quad (6)$$

wherein:
k=permeability (cm$^2$)
$\phi$=porosity (fraction)
$\tau$=tortuosity, a measure of how 'direct' the flow path is through the porous medium (dimensionless)
$a_v$=specific surface area, the ratio of pore surface area to solid volume (cm$^2$/cm$^3$)

Our modification of the Panda and Lake (1994, 1995) derivations are significant in two respects. First, we have expanded the specific surface term to incorporate the full grain size distribution:

$$a_v = \sum_{i=0}^{n} \left( \frac{\theta}{D_p i} \right) \times frac(D_p i) \quad (7)$$

wherein:
$\theta$=grain shape factor, the ratio of surface area to volume (cm$^{-1}$),
$D_p i$=the mean diameter of the i$^{th}$ grain-size bin of the population of grains (cm)
frac($D_p i$)=abundance of grains of size $D_p i$ (fraction).

Second, tortuosity due to the presence of pore-filling (detrital) clay is estimated as:

$$\tau_{clay} = \left( 1 + \frac{2c}{(1-c) \times IGV^{1/3}} \right)^2 \quad (8)$$

wherein:
IGV=the void space in the rock in the absence of any pore-filling clay or cement, and
c=fraction of IGV that is filled with clay.

Figure 10A:
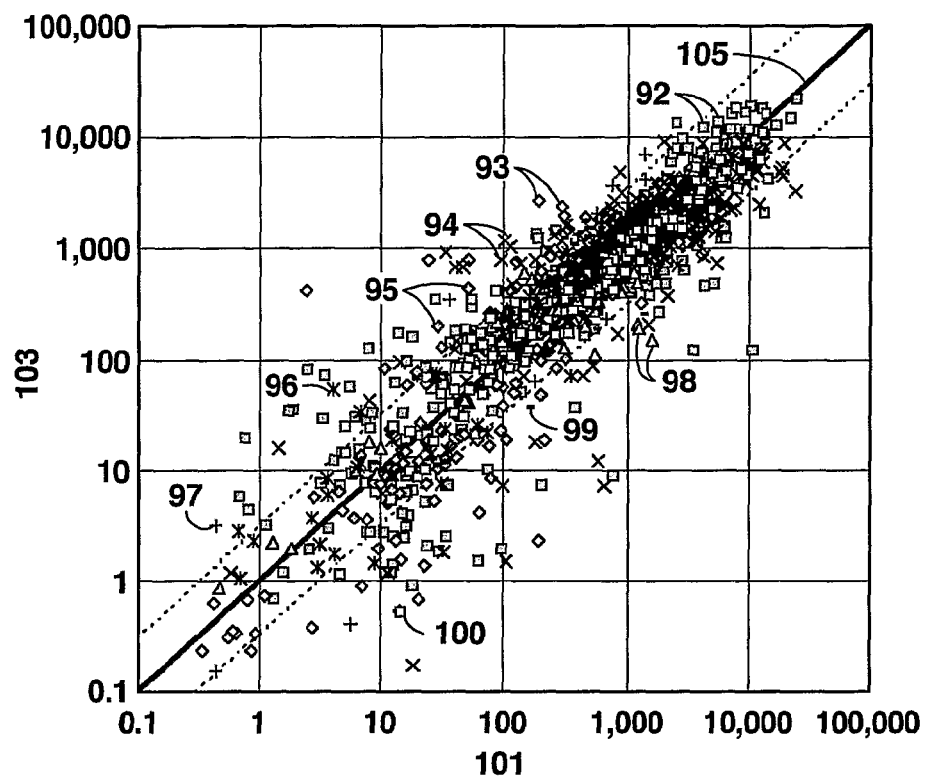
FIG. 10(a) is a graph comparing measured and calculated permeability using the bulk-sample permeability model.
Figure 10B:
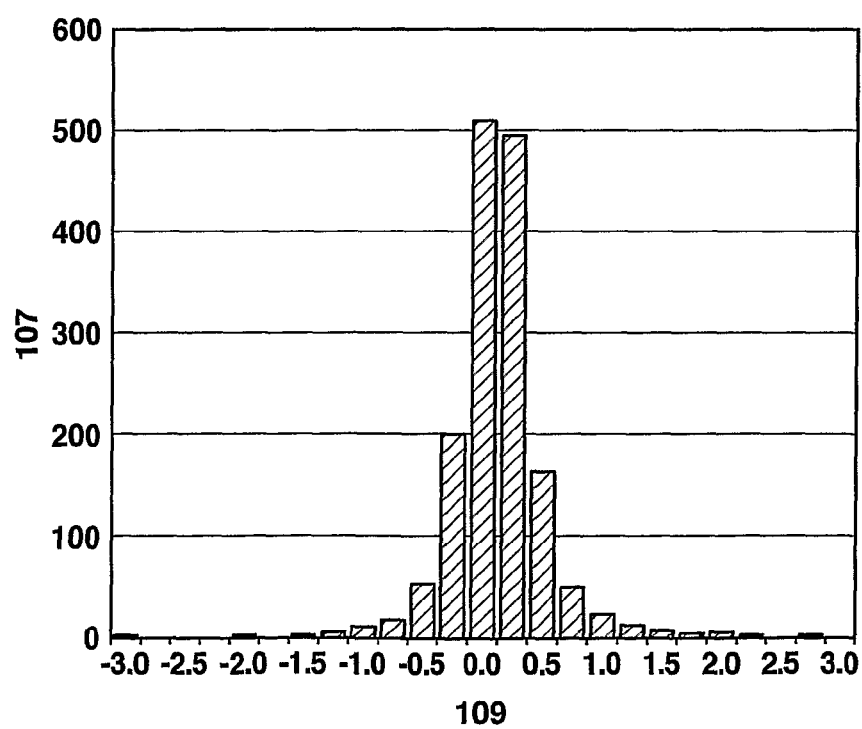
FIG. 10(b) is a graphic representation of the frequency of mismatch between measured and calculated permeability.

All other terms which are used in relation (6) are as derived by Panda and Lake (1994, 1995). This approach works well for homogeneous, lightly consolidated sandstones. FIG. 10A is a graphic representation comparing measured and calculated permeability using the bulk-sample permeability model presented above. The simulation results are plotted on the horizontal axis 101, and measured permeability data are plotted on the vertical axis 103. A 1:1 line 105 is included in the plot, indicating close agreement between measured 103 and simulated 101 results over 4 orders of magnitude. Individual data sets 92-100 are indicated by different symbols in FIG. 10A. FIG. 10B is a graphic representation of the frequency 107 of mismatch 109 between measured and calculated permeability. Approximately greater than 86% of the predictions fall within 1 order of magnitude (±0.5 log 10 mD) of the measured permeability.

In one embodiment, the Lattice-Boltzmann method can be used to numerically solve the Navier-Stokes equations of flow in three-dimensional cubes of rock. The method is capable of robustly solving flow in media with complex pore geometry, such as sandstones (e.g., Gunstensen and Rothman, 1993; Chen and Doolen, 1998; Verberg and Ladd, 1999). The method describes the movement of fluid by the collision of imaginary particles. These imaginary particles have macroscopic flow characteristics that are nearly identical to the flow characteristics of fluid.

Figure 11:
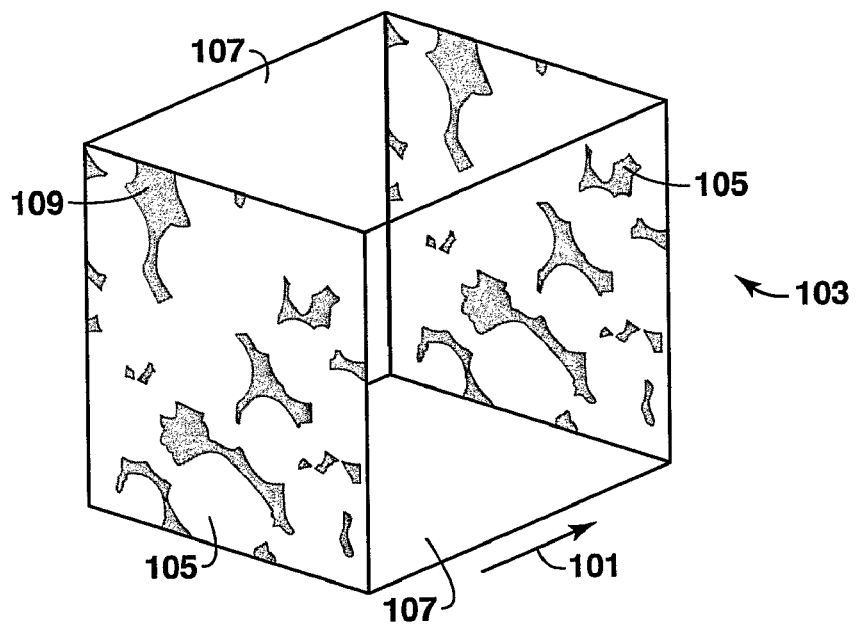
FIG. 11 is an illustration of a simulated rock cube used to predict permeability of the sandstone.

One embodiment uses the Lattice-Boltzmann algorithm of Verberg and Ladd (1999). As shown in FIG. 11, in this algorithm, a uniform pressure gradient 101 is applied across two faces of the simulated rock cube 103, and the other four sides of the cube are defined as no-flow boundaries 107. Imaginary particles are introduced into the pore space 109 in the cube 103, and these particles are allowed to collide with one another and rock grains 105 until steady-state flow (in a direction parallel to the applied pressure gradient 101) is reached. Permeability is calculated by dividing the average flux by the pressure gradient.

Figure 12:
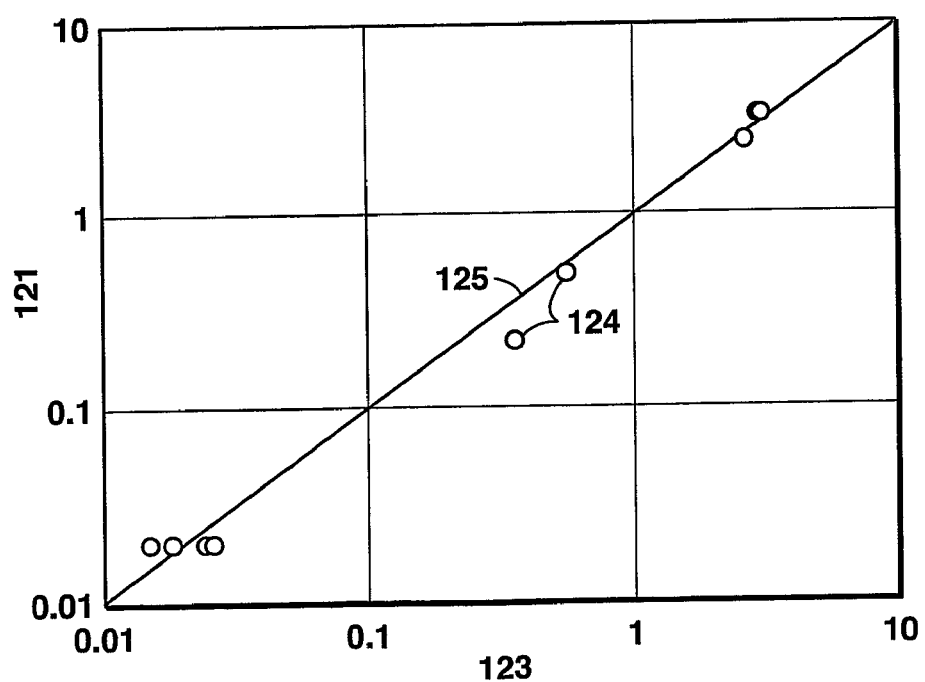
FIG. 12 is a graph comparing measured and calculated permeability using the Lattice-Boltzmann method.

This method of permeability prediction has been demonstrated to work well for rocks in which the pore structure is known. FIG. 12 is a graphic representation of measured permeability 121 compared to calculated permeability 123 using the Lattice-Boltzmann method on pore networks that have been measured by x-ray tomography. In the graph each point 124 represents measurement and prediction of a single sample. Clearly, there is a good correspondence between measured and predicted permeability as indicated by the 1:1 line 125.

If calibration data is available, each step can be checked for accuracy and model parameters can be adjusted accordingly to provide more accurate predictions of the simulation and rock properties. Calibration data includes but is not limited to thin-section observations (such as, point count data), measured porosity and measure permeability (such as, from core analysis). Examples of parameters adjusted includes but is not limited to compaction parameters (such as, grain ductibility), cement growth parameters (such as, cement kinetics), detrital clay distribution and microporosity. Therefore, at least one model parameter of at least one simulation step can be adjusted to conform the simulation results to calibration data.

Recently, Dillon et al. (2004) published a study in which they simulate porosity and permeability evolution via manipulation of sandstone images. The authors are able to more realistically model diagenetic evolution than Oren and Bakke (2002). Their methodology relies heavily on sandstone thin-section image processing; as such, they (a) require rock samples in order to begin their analysis, and (b) are limited to two-dimensional space, whereas true sandstone pore networks are three-dimensional.

Example

Figure 13:
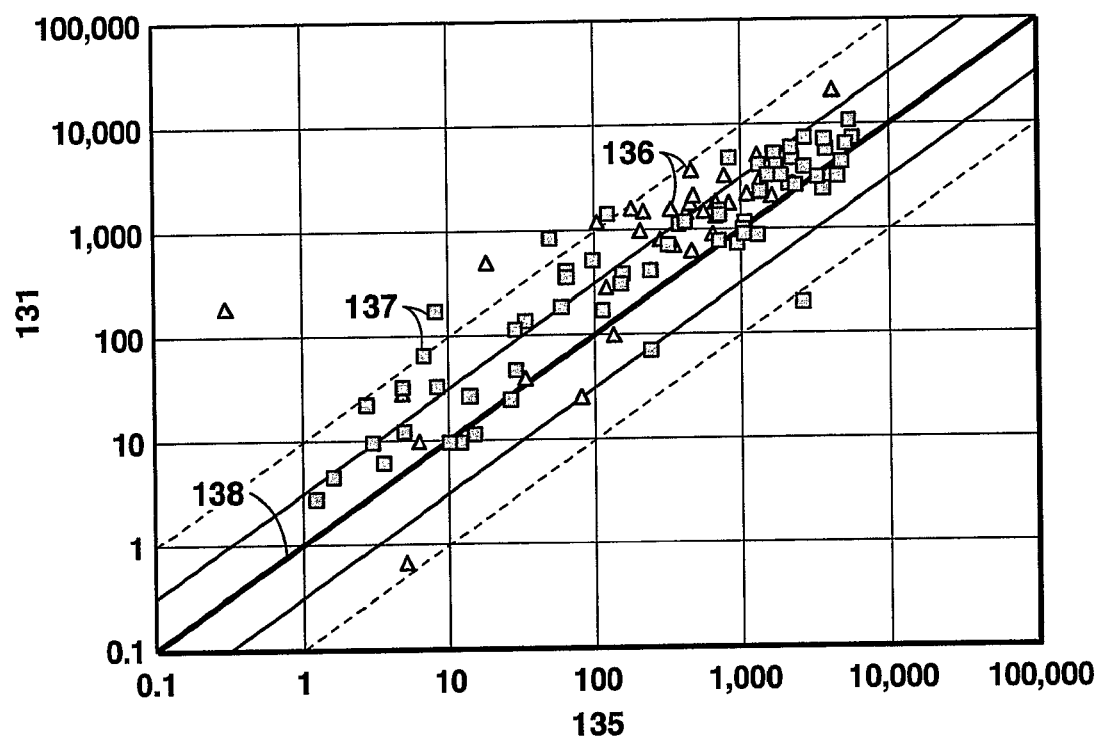
FIG. 13 is a graph comparing predicted permeability to measured permeability.

Ninety-nine samples of reservoir rock from 9 wells have been passed through the porosity simulation process described here, and the permeability of all 99 samples has been calculated with the Lattice-Boltzmann method. For all samples, the grain mineralogy and grain size distribution were known from petrography, as was detrital clay abundance and mode. A thermal burial history was modeled for each sample. Compaction of each sample was simulated, clay distributed in the resulting pore network in accord with the reported mode and abundance, and quartz cement was then simulated. Finally, the permeability of each resultant pore network was calculated using the Lattice-Boltzmann technique. As shown in FIG. 13, the predicted permeability results 131 compare well to measured permeability 135 indicating that the simulated pore networks are reasonably accurate. In the figure, each symbol represents one sample-prediction pair, either from reservoir A 136 or reservoir B 137. Predictions are reasonably accurate, as indicated by the 1:1 line 138.

The foregoing example is directed to particular embodiments of the present invention for the purpose of illustrating the invention. However, it should be understood that the invention is not to be unduly limited to the foregoing. Various modifications and alterations will be apparent to persons skilled in the art without departing from the true scope of the invention, as defined in the appended claims.

What is claimed is:

1. A method for simulating sandstone deposition comprising:
    (a) estimating grain size distribution and mineral composition distribution of grains in the sandstone;
    (b) simulating sedimentation of grains using the grain size distribution and the mineral composition distribution of the grains;
    (c) simulating compaction of the sedimented grains; and
    (d) simulating cementation of the compacted grains;
    wherein the type of deformation simulated during the compaction simulation of grains of step (c) is chosen from the group consisting of elastic deformation and any combination of elastic deformation and ductile deformation; and
    wherein the elastic deformation is modeled by using a following equation:

$$dV = \frac{Vr}{Vo} = \kappa\sigma$$

wherein:
    Vr=volume of the grain in presence of a uniform stress field,
    Vo=volume of the grain in under atmospheric conditions,
    σ=effective stress (MPa),
    κ=a compressibility constant (MPa$^{-1}$).

2. The method of claim 1 further comprising estimating properties of a sandstone from the simulated sedimentation, compaction and cementation of the grains.

3. The method of claim 2 wherein the properties of the sandstone are selected from the group consisting of permeability, connectivity, porosity and any combination thereof.

4. The method of claim 2 wherein porosity is one of the estimated properties of the sandstone and porosity is directly calculated from the volume after the simulation of sedimentation, compaction and cementation has been performed.

5. The method of claim 2 wherein permeability is one of the estimated properties of the sandstone and permeability of the sandstone is calculated by a method chosen from the group consisting of bulk-volume method, a Lattice-Bolzmann method, and any combination thereof.

6. The method of claim 1 wherein the grain size distribution and mineral composition distribution of grains in the sandstone are measured mineral distributions.

7. The method of claim 1 wherein the grain size distribution and mineral composition distribution of grains in the sandstone are modeled mineral distributions.

8. The method of claim 1 wherein the mineral composition distribution of step (a) is chosen from the group consisting of composition, shape, ductility, and microporosity of that grain, and any combination thereof.

9. The method of claim 1 wherein at least two distinct mineral composition distributions of grains are estimated in step (a) and used to simulate the sedimentation of grains in step (b).

10. The method of claim 1 wherein the simulating of sedimentation of grains of step (b) is done in three-dimensional space.

11. The method of claim 1 wherein the simulating of the sedimentation of grains of step (b) is simulated with at least two mineralogies by assigning each grain a specific weight based on its mineralogy.

12. The method of claim 1 wherein the simulating of compaction of grains of step (c) are modeled by re-arranging and deforming the grains as a result of increasing overburden stress.

13. The method of claim 1 wherein clay is introduced inside pores between the grains.

14. The method of claim 1 further comprising adjusting at least one model parameter of at least one simulation step to conform the simulation results to calibration data.

15. A method for simulating sandstone deposition comprising:
   (a) estimating grain size distribution and mineral composition distribution of grains in the sandstone;
   (b) simulating of sedimentation of grains using the grain size distribution and the mineral composition distribution of the grains;
   (c) simulating compaction of the sedimented grains; and
   (d) simulating cementation of the compacted grains;
   wherein the type of deformation simulated during the compaction simulation of grains of step (c) is chosen from the group consisting of ductile deformation and any combination of ductile deformation and elastic deformation; thereof; and wherein the ductile deformation is modeled using a following equation:

$$V_{dg} = V_{ug} = 4/3 \pi r_{ug}^3$$

wherein:
   $V_{dg}$=volume of the grain after deformation,
   $V_{ug}$=volume of the grain before deformation, and
   $r_{ug}$ is undeformed grain radius.

16. A method for simulating sandstone deposition comprising:
   (a) estimating grain size distribution and mineral composition distribution of grains in the sandstone;
   (b) simulating of sedimentation of grains using the grain size distribution and the mineral composition distribution of the grains;
   (c) simulating compaction of the sedimented grains; and
   (d) simulating cementation of the compacted grains, wherein during the simulating of cementation of step (d) cement growth rate is calculated using the following expanded Arrhenius kinetic formulation:

$$\text{rate} = (A_{Can}ff_{Can} + A_{Ceu}ff_{Ceu} + A_{Aan}ff_{Aan} + A_{Aeu}ff_{Aeu})e^{-Ea/RT}$$

wherein:
   rate=instantaneous nucleation rate ($mol \cdot s^{-1}$),
   Ceu=euhedrally terminated c-axis growth face,
   Can=non-euhedral c-axis growth face,
   Aeu=euhedrally terminated a-axis growth face,
   Aan=non-euhedral a-axis growth face,
   $A_x$=surface area corresponding to each of the above-defined growth faces ($cm^2$),
   $ff_x$=Arrhenius preexponential constant corresponding to each of the above-defined growth faces ($mol \cdot cm^{-2} \cdot s^{-1}$),
   Ea=activation energy of the nucleation reaction ($J \cdot mol^{-1}$),
   R=Ideal gas constant ($J \cdot mol^{-1} \cdot K^{-1}$), and
   T=temperature (K).

17. A method for simulating sandstone deposition comprising:
   (a) estimating grain size distribution and mineral composition distribution of grains in the sandstone;
   (b) simulating of sedimentation of grains using the grain size distribution and the mineral composition distribution of the grains;
   (c) simulating compaction of the sedimented grains; and
   (d) simulating cementation of the compacted grains, and further comprising using a burial history model to help simulate cementation, wherein elastic deformation simulated during the compaction simulation of grains of step (c) is modeled by using a following equation:

$$dV = \frac{Vr}{Vo} = \kappa \sigma$$

wherein:
   Vr=volume of the grain in presence of a uniform stress field,
   Vo=volume of the grain in under atmospheric conditions,
   σ=effective stress (MPa),
   κ=a compressibility constant ($MPa^{-1}$).

18. The method of claim 17 wherein the type of deformation simulated during the compaction simulation of grains of step (c) is a combination of ductile deformation and elastic deformation.

* * * * *